United States Patent
Coldwate et al.

(10) Patent No.: US 11,539,322 B1
(45) Date of Patent: Dec. 27, 2022

(54) FAULT TOLERANT MOTOR INCLUDING REDUNDANT WYE WINDING AND DUAL-STATE NEUTRAL LEADS

(71) Applicant: Hamilton Sundstrand Corporation, Charlotte, NC (US)

(72) Inventors: Joseph Kenneth Coldwate, Roscoe, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/347,721

(22) Filed: Jun. 15, 2021

(51) Int. Cl.
*H02P 29/028* (2016.01)
*H02P 27/04* (2016.01)

(52) U.S. Cl.
CPC ............ *H02P 29/028* (2013.01); *H02P 27/04* (2013.01)

(58) Field of Classification Search
CPC ........ H02P 29/02; H02P 29/028; H02P 27/04; H02P 2209/01
See application file for complete search history.

(56) References Cited

U.S. PATENT DOCUMENTS

| 3,702,964 | A | 11/1972 | Kudlacik et al. |
| 6,703,749 | B2 | 3/2004 | Kuroyanagi |
| 10,536,104 | B2 * | 1/2020 | Bando ........................ H02P 9/04 |
| 2016/0028336 | A1 * | 1/2016 | Oyama .................. H02P 29/032 318/564 |
| 2018/0254735 | A1 | 9/2018 | Koenig et al. |
| 2018/0294760 | A1 | 10/2018 | Koenig et al. |
| 2019/0229670 | A1 * | 7/2019 | Arisawa .................. H02P 25/18 |
| 2022/0014140 | A1 * | 1/2022 | Singh ....................... H02P 25/22 |

FOREIGN PATENT DOCUMENTS

| DE | 10204489 A1 * | 8/2003 | ................ H02P 3/04 |
| EP | 3145042 A1 * | 3/2017 | ................ B63J 3/02 |
| WO | WO-2021065581 A * | 4/2021 | |

* cited by examiner

*Primary Examiner* — Bickey Dhakal
(74) *Attorney, Agent, or Firm* — Cantor Colburn LLP

(57) ABSTRACT

An electric motor system implements a redundant wye-wounded motor that includes first phase leads, second phase leads, first neutral leads, and second neutral leads. The first and second phase leads receive alternating current (AC) power from a power supply. A first phase-lead switch selectively connects the first phase leads to the power supply, and a second phase-lead switch selectively connects the second phase leads to the power supply. A first neutral-lead switch selectively connects the first neutral leads to the redundant wye-wounded motor, and a second neutral-lead switch selectively connects the second neutral leads to the redundant wye-wounded motor. A controller detects a circuit fault among a plurality of different types of circuit faults, and controls the operation of one or both of the primary neutral-lead switch and the second neutral-lead switch based on the circuit fault.

18 Claims, 3 Drawing Sheets

FAULT TOLERANT MOTOR INCLUDING REDUNDANT WYE WINDING AND DUAL-STATE NEUTRAL LEADS

BACKGROUND

Non-limiting embodiments are related generally to electric motors, and more particularly, to redundant wye-wounded motors.

Electrical systems, such as in aircraft, commonly utilize electric motors to provide mechanical power to various systems. In some electric motors it can be desirable to have windings tied in parallel with one another between a motor feed and neutral terminals within the motor. Such parallel windings can provide reduced electrical losses from winding resistance and inductance, along with efficient operation at high electrical frequencies. The parallel windings generally tie together at a neutral node located within the motor such that a single feed for each motor phase connects to externally to a power source, which is typically through an overcurrent protection device like a circuit breaker or fuse.

BRIEF DESCRIPTION

According to a non-limiting embodiment, an electric motor system comprises a redundant wye-wounded motor including a first plurality of phase leads and a second plurality of phase leads and including a first plurality of neutral leads and a second plurality of neutral leads. The first and second plurality of phase leads are configured to receive alternating current (AC) power from a power supply. The electric motor system comprises a first phase-lead switch configured to selectively connect the first plurality of phase leads to the power supply, and a second phase-lead switch configured to selectively connect the second plurality of phase leads to the power supply. The electric motor system further comprises a first neutral-lead switch configured to selectively connect the first plurality of neutral leads to the redundant wye-wounded motor, and a second neutral-lead switch configured to selectively connect the second plurality of neutral leads to the redundant wye-wounded motor. The electric motor system further comprises a controller in signal communication with the redundant wye-wounded motor. The controller is configured to detect a circuit fault among a plurality of different types of circuit faults, and to control the operation of one or both of the primary neutral-lead switch and the second neutral-lead switch based on the circuit fault.

According to another non-limiting embodiment, a method of controlling an electric motor system is provided. The method comprises delivering alternating current (AC) power to a redundant wye-wounded motor that includes a first plurality of phase leads and a second plurality of phase leads and includes a first plurality of neutral leads and a second plurality of neutral leads. The method further comprises establishing, via a first phase-lead switch, a first selectable signal path that connects the first plurality of phase leads to the power supply, and establishing, via a second phase-lead switch, a second selectable signal path that connects the second plurality of phase leads to the power supply. The method further comprises establishing, via a first neutral-lead switch, a third selectable signal path that connects the first plurality of neutral leads to the redundant wye-wounded motor, and establishing, via a second neutral-lead switch, a fourth selectable signal path that connects the second plurality of neutral leads to the redundant wye-wounded motor. The method further comprises detecting, via a controller in signal communication with the redundant wye-wounded motor, a circuit fault among a plurality of different types of circuit faults. The method further comprises controlling, via the controller, the operation of one or both of the primary neutral-lead switch and the second neutral-lead switch based on the circuit fault.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
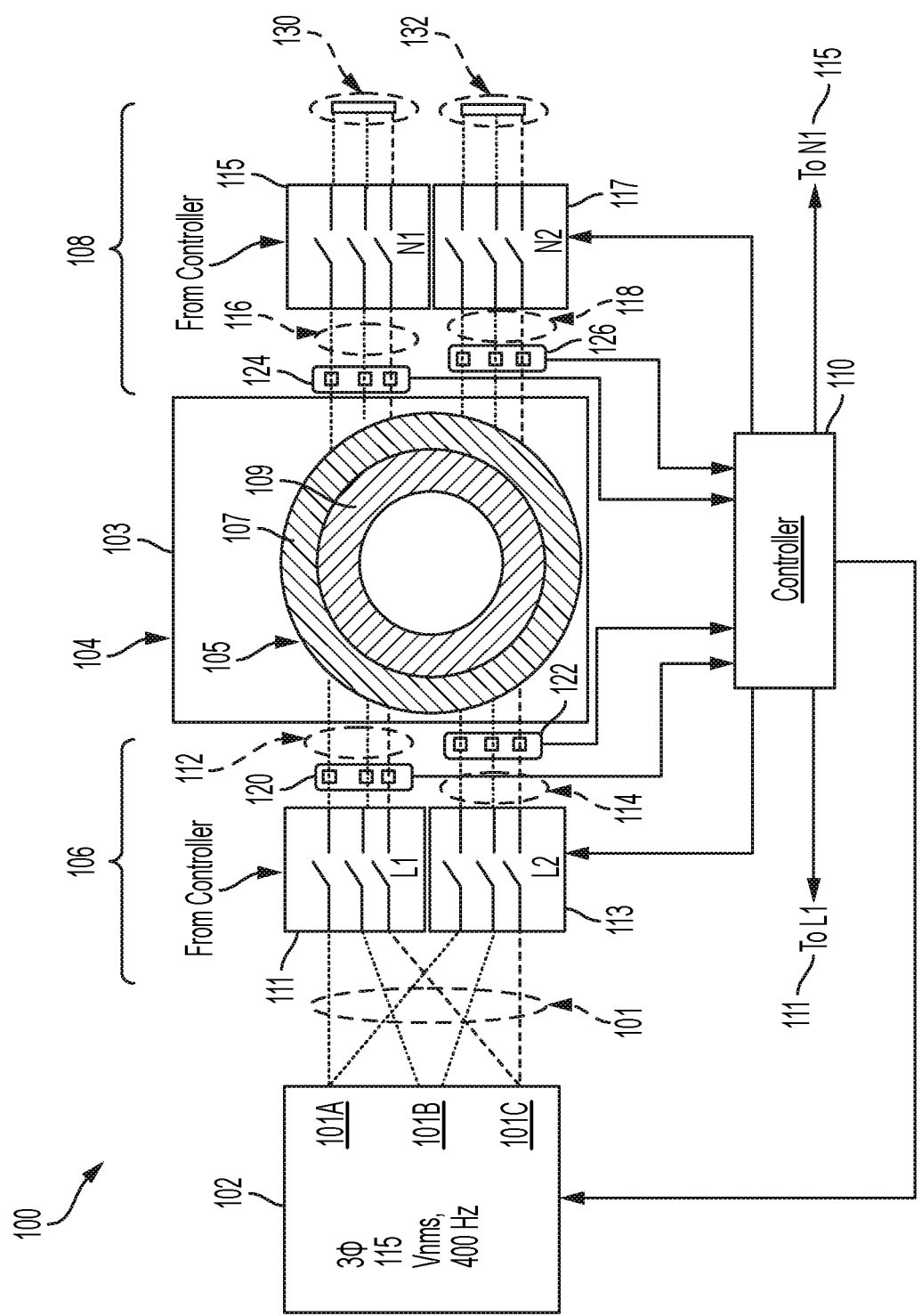
FIG. 1 is a block diagram illustrating an electric motor system according to a non-limiting embodiment.

As described above, traditional electric motors that implement parallel windings have a common neutral node located within the motor such that a single feed for each motor phase connects externally to a power source. Occasionally, one of the parallel windings within the motor can exhibit increased resistance, may experience an open circuit, or may experience a short circuit. The increased resistance or electrically open circuit on the parallel winding can cause current provided by the phase lead to be shunted through the remaining parallel winding can potentially cause overcurrent stress on the remaining parallel winding due to the increased current. This increased current can cause overheating in the remaining parallel winding(s), potentially reducing motor reliability and/or damage to the motor.

To mitigate open circuit and short circuit faults, redundant wye-wounded motor designs have been developed, which provided redundancy fault protection by employing two separate windings, e.g., a main primary wye winding and a secondary wye winding. In the event there is an open circuit fault on the primary winding, the primary winding can be deactivated (i.e., disconnected) and the secondary winding can be activated (i.e., connected). If the fault in the primary winding experiences a short-circuit condition (as opposed to an open condition) there will continue to be current flow through the faulted primary wye windings through its neutral node, This fault current and resultant parasitic torque that impedes normal motor operation. As mentioned above, however, that neutral node or neutral connection is typically located within the motor. Therefore, short-circuit protection circuitry is omitted from conventional redundant motor designs.

Various non-limiting embodiments described herein provide a parallel winding motor that implements a stator including a primary wye winding and a secondary wye winding. Rather than forming an internal neutral as found in conventional parallel winding stator designs, at least one non-limiting embodiment exposes all three neutral winding leads of each wye winding to the exterior of motor.

Each of the primary wye winding set and the secondary wye winding set includes three phase leads and three neutral leads. When the phase leads are energized, the three neutral leads are also connected to form the neutral node exterior to the motor stator. A neutral switch is coupled to the neutral node and is configured to selectively connect or disconnect the neutral node to the motor to establish dual-state neutral leads. When not powered, the neutral connection of the non-energized wye winding can remain open. In this manner, if a short-circuit event occurs such as a phase-to-phase fault or a phase-to-ground fault, for example, the open circuit at the neutral node prevents current from continuing to flow through the neutral connection. In addition, because one or more non-limiting embodiments control the neutral node switch such that the neutral node is closed only when its corresponding winding set is energized, damage imparted onto the energized active winding set caused by fault current and parasitic torque caused by a non-active shorted winding can be limited or even completely prevented.

With reference now to FIG. 1, an electric motor system 100 is illustrated according to a non-limiting embodiment. The electric motor system 100 includes a power supply 102, an electric motor 104, a phase lead region 106, a neutral lead region 108, and a motor controller 110.

The power supply 102 include one or more outputs 101 configured to deliver an alternating current (AC) signal. In one or more non-limiting embodiments, the power supply 102 includes a three-phase power supply 102 that outputs a first pair of first-phase AC power signals 101A, a second pair of second-phase AC power signals 101B, and a third pair of third-phase AC power signals 101C, The first pair of first-phase AC power signals 101A, the second pair of second-phase AC power signals 101B, and the third pair of third-phase AC power signals 101C are offset in phase by 120 electrical degrees with respect to one another. In one or more examples, each of the first pair of first-phase AC power signals 101A, the second pair of second-phase AC power signals 101B, and the third pair of third-phase AC power signals 101C have a voltage level of about 115 Vrms and a frequency of about 400 Hz. It should be appreciated, that other types of power supplies capable of generating different voltage levels and/or frequencies can be employed without departing from the scope of the invention.

The electric motor 104 can be constructed as a redundant wye-wounded motor 104, which includes a stator 105 disposed within a housing 103. The stator 105 is constructed as a dual-winding stator 105, which includes a primary wye winding 107 (e.g., a first winding 107 or outer winding 107) and a secondary winding 109 (e.g., a secondary winding 109 or inner winding 109). It should be appreciated that the primary and secondary wye windings are not limited to the outer winding the inner winding, respectively. In other non-limiting embodiments, the primary wye winding can correspond to the inner wye winding 109 and the secondary wye winding can correspond to the outer wye winding 107 without departing from the scope of the invention.

The motor 104 further includes a first plurality of phase leads 112 corresponding to the primary winding 107, a second plurality of phase leads 114 corresponding to the secondary winding 109, a first plurality of neutral leads 116 corresponding to the primary winding 107, and a second plurality of neutral leads 118 corresponding to the secondary winding 109. The first plurality of phase leads 112 and the second plurality of phase leads 114 are located in the phase lead region 106, and are selectively connected to respective signal paths to the power supply 102 via first and second phase-lead switches 111 and 113, respectively (also referred to as primary and secondary switches 111 and 113, respectively).

According to a non-limiting embodiment, the first plurality of phase leads 112 includes a first phase lead, a second phase lead and a third phase lead. The first phase lead is selectively connected to the first-phase AC power signal 101A via a first phase switch path included in the first phase-lead switch 111. The second phase lead is selectively connected to the second-phase AC power signal 101B via a second phase switch path included in the first phase-lead switch 111. The third phase lead is selectively connected to the third-phase AC power signal 101C via a third phase switch path included in the first phase-lead switch 111.

According to a non-limiting embodiment, the second plurality of phase leads 114 also includes a first phase lead, a second phase lead and a third phase lead. The first phase lead is selectively connected to the first-phase AC power signal 101A via a first phase switch path included in the second phase-lead switch 113. The second phase lead is selectively connected to the second-phase AC power signal 101B via a second phase switch path included in the second phase-lead switch 113. The third phase lead is selectively connected to the third-phase AC power signal 101C via a third phase switch path included in the second phase-lead switch 113.

The first plurality of neutral leads 116 and the second plurality of phase leads 118 are located in the neutral region 108, which is located externally from the motor housing 103. The first neutral leads 116 establish signal connection between the primary winding 107 and a first neutral node 130. The second neutral leads 118 establish signal connection between the secondary winding 109 a second neutral node 130. For example, first ends of the neutral leads 116 and the second plurality of phase leads 118 are selectively connected to the stator 105, while opposing second ends of the neutral leads 116 and the second plurality of phase leads 118 are located externally from the housing 103. Accordingly, the neutral leads 116 and 118 are accessible at an area that is external to the housing 103 in contrast to traditional electric motor which locate the neutral leads within the housing making them difficult to access. The first plurality of neutral leads 116 establish signal communication between the primary winding 107 and the first neutral node 130. Similarly, the second plurality of neutral leads 118 establish signal communication between the second winding 109 and the second neutral node 132. In one or more non-limiting embodiments, a signal communication path with the first neutral node 130 is selectively established when a first neutral-lead switch 115 (also referred to as a primary neutral-lead switch 115) is closed, thereby connecting the three neutral leads 116 together and forming the electrical neutral for the primary wye winding 105. A signal communication path with the second neutral node 132 is selectively established when a second neutral-lead switch 117 (also referred to as a secondary neutral-lead switch 117) is closed, thereby connecting the three neutral leads 118 together and forming the electrical neutral for the secondary wye winding 109. It should be appreciated that although, first neutral-lead switch 115, first neutral node 130, second neutral-lead switch 117, and second neutral node 132 are illustrated as being located remotely from the motor assembly 103 (see FIG. 1), one or more non-limiting embodiments locates the first neutral-lead switch 115, first neutral node 130, second neutral-lead switch 117, and second neutral node 132 internal to the motor housing 103 becoming part of the motor assembly 104.

According to a non-limiting embodiment, the first plurality of neutral leads 116 includes a first neutral lead, a second neutral lead, and a third neutral lead. The first neutral lead of the first plurality of neutral leads 116 is selectively connected to the stator 105 via a first neutral switch path included in the first neutral-lead switch 115. The second neutral lead of the first plurality of neutral leads 116 is selectively connected to the stator 105 via a second neutral switch path included in the first neutral-lead switch 115. The third neutral lead of the first plurality of neutral leads 116 is selectively connected to the stator 105 via a third neutral switch path included in the first neutral-lead switch 115.

According to a non-limiting embodiment, the second plurality of neutral leads 118 also includes a first neutral lead, a second neutral lead, and a third neutral lead. The first neutral lead of the second plurality of neutral leads 118 is selectively connected to the stator 105 via a first neutral switch path included in the second neutral-lead switch 117. The second neutral lead of the second plurality of neutral leads 118 is selectively connected to the stator 105 via a second neutral switch path included in the second neutral-lead switch 117. The third neutral lead of the second plurality of neutral leads 118 is selectively connected to the stator 105 via a third neutral switch path included in the second neutral-lead switch 117.

The first plurality of phase leads 112 and the first plurality of neutral leads 116 establish electrical paths through the phase lead region 106 and the neutral lead region 108, respectively. The second plurality of phase leads 114 and second plurality of neutral leads 118 also establish electrical paths through the phase lead region 106 and the neutral lead region 108, respectively. However, the electrical paths established by the first plurality of phase leads 112 and the first plurality of neutral leads 116 are independent from the electrical paths established by the second plurality of phase leads 114 and second plurality of neutral leads 118 so as to facilitate a fault tolerant redundant motor 104.

The first phase-lead switch 111 and first neutral-lead switch 115 can be switched independently with respect to the second phase-lead switch 113 and the second neutral-lead switch 117. For example, the first phase and neutral switches 111 and 115 can be opened in response to detecting a fault on the first plurality of phase leads 112 and/or the first plurality of neutral leads 116, and/or internal to the coils of the primary winding 107. However, electrical connection between the power supply 102 and the stator 105 can still be established using the second plurality of phase leads 114 and second plurality of neutral leads 118 while the second phase and neutral switches 113 and 117 are closed. Control of the first phase-lead switch 111, first neutral-lead switch 115, second phase-lead switch 113 and second neutral-lead switch 117 is controlled by the motor controller 110, as discussed in greater detail below.

The motor controller 110 is in signal communication with the power supply 102 and the motor 104. With respect to the power supply 102, the motor controller 110 is configured to control the phase, voltage level and/or frequency of the outputs 101A, 101B and 101C. For example, the motor controller 110 can receive inputs that select the phase, voltage level and/or frequency for the outputs 101A, 101B and 101C, and control the power supply 102 to generate the outputs 101A, 101B and 101C with the selected phase, voltage level and/or frequency, accordingly.

With respect to the motor 104, the motor controller 110 is in signal communication with the first phase-lead and neutral-lead switches 111 and 115, and is also in signal communication with the second phase-lead and neutral-lead switches 113 and 117. The motor controller 110 is configured to selectively open and close the first phase-lead and neutral-lead switches 111 and 115 based on the current level and/or voltage level present on the first plurality of phase leads 112 and/or the first plurality of neutral leads 116, and/or as measured at the first neutral node 130. Similarly, the motor controller 110 is configured to selectively open and close the second phase-lead and neutral-lead switches 113 and 117 based on the current level and/or voltage level present on the second plurality of phase leads 114 and/or the second plurality of neutral leads 118, and/or as measured at the neutral node 132.

The current level and/or voltage level can be determined using one or more primary phase-lead sensors 120, one or more secondary phase-lead sensors 122, one or more primary neutral-lead sensors 124 and one or more secondary neutral-lead sensors 126. The primary phase-lead sensors 120, secondary phase-lead sensors 122, primary neutral-lead sensors 124, and secondary neutral-lead sensors 126 are in signal communication with the motor controller 110.

The primary phase-lead sensors 120 are configured to monitor the current and/or voltage present on a respective phase lead included in the first plurality of phase leads 112, and are configured to output a measurement signal indicative of the measured current or voltage. Similarly, the secondary phase-lead sensors 122 are configured to monitor the current and/or voltage present on a respective phase lead of the second plurality of phase leads 114, and are configured to output a measurement signal indicative of the measured current or voltage.

The primary neutral-lead sensors 124 are configured to monitor the current and/or voltage present on a respective neutral lead included in the first plurality of neutral leads 116, and are configured to output a measurement signal indicative of the measured current or voltage. Similarly, the secondary neutral-lead sensors 126 are configured to monitor the current and/or voltage present on a respective neutral lead of the second plurality of neutral leads 118, and are configured to output a measurement signal indicative of the measured current or voltage.

The motor controller 110 can utilize the primary neutral-lead sensors 120, the secondary phase-lead sensors 122, the primary neutral-lead sensors 124, and/or the secondary neutral-lead sensors 126 to detect aa circuit fault (e.g., an overcurrent event or short-circuit) in the motor system 100. When the first plurality of phase leads 112 and the first plurality of neutral leads 116 are energized, one or more primary neutral-lead sensors 124 sense voltage present on the neutral leads 116, and output a first signal indicating the sensed voltage to the control module 110. The control module 110 can compare the sensed voltage to a voltage threshold and detect the presence of the circuit fault (e.g., overcurrent event or short-circuit) in response to the sensed voltage exceeding the voltage threshold.

Although the aforementioned example detects an overcurrent event or short-circuit in response to measuring voltage in the first plurality of neutral leads 116, it should be appreciated that the overcurrent event or short-circuit can be detected in response to measuring the current and comparing the measured current to one or more current thresholds.

As described herein, the motor controller 110 is in signal communication with the first and second neutral-lead switches 115 and 117. Accordingly, the motor controller 110 can selectively open and close the first and second neutral-lead switches 115 and 117 based on the current level and/or voltage level present on the first plurality of phase leads 116 and the second plurality of phase leads 118 as measured by the primary neutral-lead sensors 124 and the secondary neutral-lead sensors 126, respectively. In at least one non-limiting embodiment, the motor controller 110 is capable of detecting different types of circuit faults based on the measurement signals output from one or both of the primary neutral-lead sensors 124 and the secondary neutral-lead sensors 126. In this manner, the motor controller 110 can control the first neutral-lead switch 115 or the second neutral-lead switch 117 based on the detected circuit fault.

According to a non-limiting embodiment, the motor controller 110 operates according to the logic table presented below:

TABLE 1

| | Baseline: No Fault FULL: | Turn-to-Turn Fault FULL: | Phase-to-Phase Fault HALF: | Phase-to-Ground Fault HALF: |
|---|---|---|---|---|
| Active Winding | Both Inner AND Outer in parallel | Both Inner AND Outer in parallel | Inner winding OR Outer winding | Inner winding OR Outer winding |
| Neutral voltage to trigger action | N/A | N1>5V pk N2>5V pk | N1>12V pk N2>12V pk | N1>40V pk N2>40V pk |
| Fault detection action | None | No Switch Action Generate Alert Indicator | Open contacts of faulted winding (L1 and N1), OR (L2 and N2) | Open contacts of faulted winding (L1 and N1), OR (L2 and N2) |
| Full performance after action? | YES | YES | YES | YES |

Referring to the logic table (Table 1), the motor controller operates the primary phase-lead switch 111 (e.g., first phase-lead switch 111) and primary neutral-lead switch 115 (e.g., first neutral-lead switch 115) and/or the secondary phase-lead switch 113 (e.g., the second phase-lead switch 113) and secondary neutral-lead switch 117 (e.g., the second neutral-lead switch 117) based on the type of detected circuit fault. In a first example the motor controller 110 can detect a first circuit fault (e.g., a turn-to-turn fault) in response to the measured voltage of one or both of the first plurality of neutral leads 116 and the second plurality of neutral leads 118 exceeding a first voltage threshold level (e.g., 5V pk). In response to detecting the turn-to-turn fault, the motor controller 110 generates a fault alert indicator. The fault alert indicator includes, but is not limited to, an audio alert, an illumination alert and/or graphical alert (e.g., on a dashboard or GUI).

In another example, the motor controller 110 can detect a second circuit fault (e.g., a phase-to-phase fault) in response to the measured voltage of one or both of the first plurality of neutral leads 116 and the second plurality of neutral leads 118 exceeding a second voltage threshold level (e.g., 12V pk) that is greater than the first voltage level (e.g., 5V pk). In response to detecting the phase-to-phase fault, the motor controller 110 disconnects either the first phase and neutral leads 112 and 116 or the second phase and neutral leads 114 and 118, based on which winding set is experiencing the fault. By opening a given neutral switch (either the first neutral-lead switch 115 or the second neutral-lead switch 117), for example, the corresponding first neutral node (i.e., either the first neutral node 130 or the corresponding second neutral node 132) are disconnected from the stator 105. This results in a wye winding with an open neutral (no connection). In the event of a detected fault on the primary winding 107, the first phase-lead switch 111 and the first neutral-lead switch 115 are controlled to be opened simultaneously, or substantially simultaneously, to minimize, or in some instances completely avoid, the consequences of the fault. In the event of a detected fault on the secondary winding 109, the second phase-lead switch and the second neutral-lead switch 117 are controlled to be opened simultaneously, or substantially simultaneously, to minimize, or in some instances completely avoid, the consequences of the fault.

In yet another example, the motor controller 110 can detect a third circuit fault (e.g., a phase-to-ground fault) in response to the measured voltage of one or both of the first plurality of neutral leads 116 and the second plurality of neutral leads 118 exceeding a third voltage threshold level (e.g., 40V pk) that is greater than the first voltage level (e.g., 5V pk) and the second voltage level (e.g., 12V pk). In response to detecting the phase-to-ground fault, the motor controller 110 disconnects either the first phase and neutral leads 112 and 116 or the second phase and neutral leads 114 and 118, based on which leads are experiencing the third fault. By opening a given neutral switch (either the first neutral-lead switch 115 or the second neutral-lead switch 117), for example, the corresponding neutral node (i.e., either the first neutral node 130 or the second neutral node 132) are disconnected from the stator 105. This results in a wye winding with an open neutral (no connection). In the event of a detected fault on the primary winding 107, the first phase-lead switch 111 and the first neutral-lead switch 115 are controlled to be opened simultaneously, or substantially simultaneously, to minimize, or in some instances completely avoid, the consequences of the fault. In the event of a detected fault on the secondary winding 109, the second phase-lead switch 113 and the second neutral-lead switch 117 are controlled to be opened simultaneously, or substantially simultaneously, to minimize, or in some instances completely avoid, the consequences of the fault.

In all of the examples described above, the motor system 100 allows for maintaining electrical connection between the power supply 102 and the stator 105 when a fault is detected on one of the phase leads 112/114 or neutral leads 116/118 by closing the phase-lead switches 111/113 or neutral-lead switches 115/117 corresponding to the non-faulty phase and neutral leads. In this manner, the motor 104 can remain operational, while the neutral-lead switch 115 or 117 corresponding to the faulty neutral leads 116 or 118 is opened so as to prevent the faulty neutral leads 116 or 118 from allowing the occurring short or open fault to propagate and cause residual damage to the motor 104.

Figure 2A:
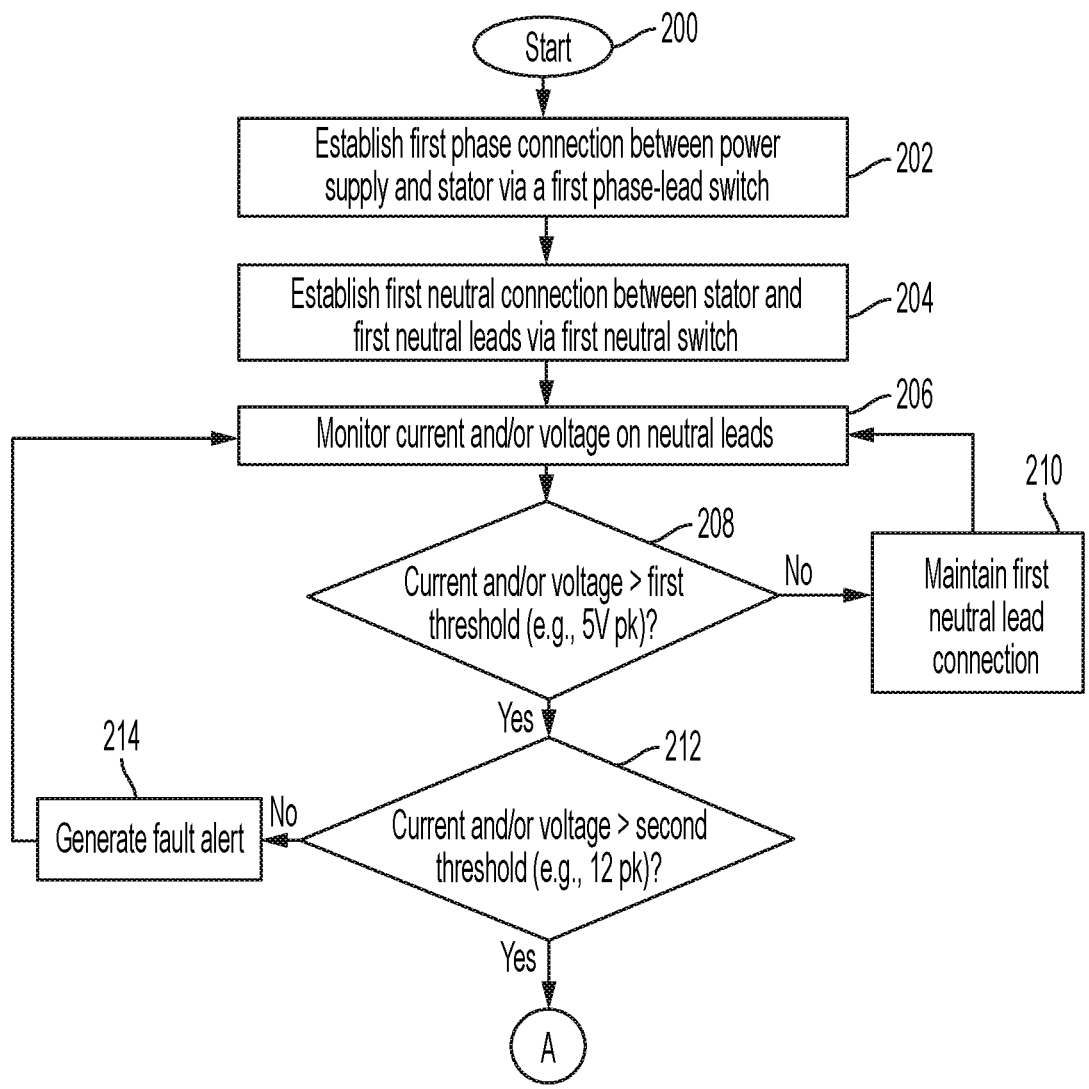
FIGS. 2A and 2B depict a flow diagram illustrating a method of controlling a fault tolerant redundant motor according to a non-limiting embodiment.
Figure 2B:
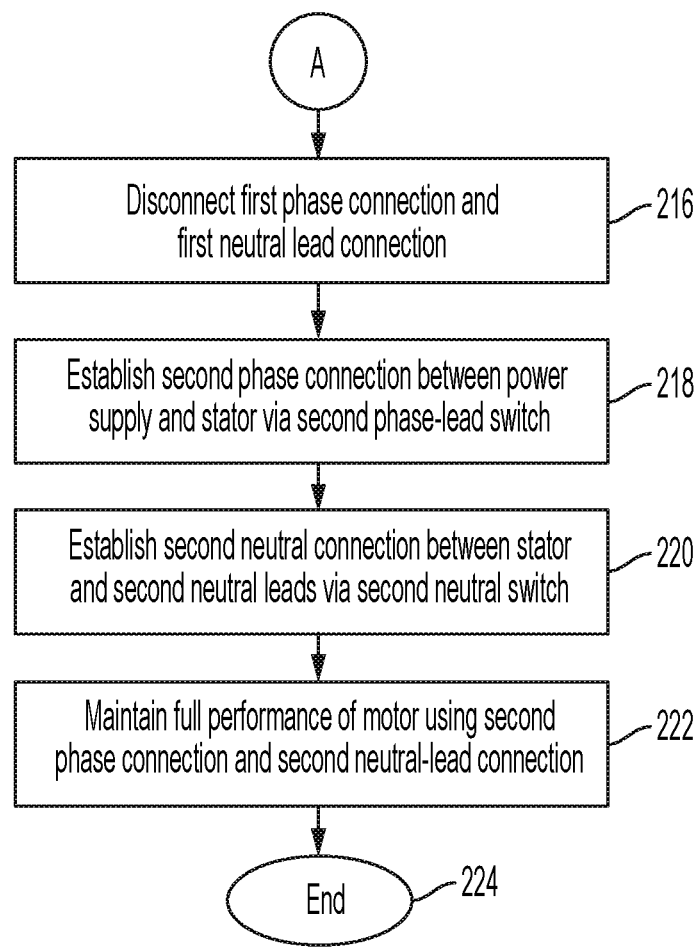

Turning now to FIGS. 2A and 2B, a method of controlling a fault tolerant redundant motor is illustrated according to a non-limiting embodiment. The method begins at operation 200 and at operation 202 a first phase voltage connection is established between a power supply 102 and a dual-winding stator 105. The first phase voltage connection can be established via a first phase-lead switch 111. At operation 204, a first neutral voltage connection is established between the dual-winding stator 105 and a first plurality of neutral leads 116. The first neutral voltage connection can be established via a first neutral-lead switch 115. Accordingly, full performance of the fault tolerant redundant motor is established based on the first phase voltage connection and the first neutral-lead connection.

At operation 206, the current and/or voltage present on the first plurality of neutral leads 116 is measured. At operation 208, a determination is made as to whether the measured current and/or measured voltage exceeds a first current threshold or a first voltage threshold, respectively. When the measured current and/or measured voltage does not exceed the respective first current threshold or first voltage threshold, the first neutral lead connection is maintained at operation 210, and the method returns to operation 206 to continue measuring the current and/or voltage present on the first plurality of neutral leads 116. The first neutral lead connection can be maintained by maintaining the first neutral-lead switch 115 in a closed state.

When, however, the measured current and/or measured voltage exceeds the respective first current threshold or first voltage threshold at operation 208, a determination is made at operation 212 as to whether the measured current and/or measured voltage exceeds a second current threshold or a second voltage threshold, respectively. When the measured current and/or measured voltage does not exceed the respective second current threshold or the second voltage threshold, a fault alert is generated at operation 214, and the method returns to operation 206 to continue measuring the current and/or voltage present on the first plurality of neutral leads 116.

When, however, the measured current and/or measured voltage exceeds the respective second current threshold or the second voltage threshold, respectively, the first neutral lead connection is disconnected at operation 216 (see FIG. 2B). The first neutral lead connection can be disconnected by transitioning the first neutral-lead switch 115 into an open state. At operation 218, a second phase voltage connection is established between the power supply 102 and the dual-winding stator 105. The second phase voltage connection can be established via a second phase-lead switch 113. At operation 220, a second neutral voltage connection is established between the dual-winding stator 105 and a second plurality of neutral leads 118. The second neutral voltage connection can be established via a second neutral-lead switch 117. At operation 222, full performance of the fault tolerant redundant motor is maintained based on the second phase voltage connection and the second neutral-lead connection, and the method ends at operation 224.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric motor system comprising:
    a redundant wye-wounded motor including a first plurality of phase leads and a second plurality of phase leads and including a first plurality of neutral leads and a second plurality of neutral leads, the first and second plurality of phase leads configured to receive alternating current (AC) power from a power supply;
    a first phase-lead switch configured to selectively connect the first plurality of phase leads to the power supply, and a second phase-lead switch configured to selectively connect the second plurality of phase leads to the power supply;
    a first neutral-lead switch configured to selectively connect the first plurality of neutral leads to the redundant wye-wounded motor, and a second neutral-lead switch configured to selectively connect the second plurality of neutral leads to the redundant wye-wounded motor; and
    a controller in signal communication with the redundant wye-wounded motor, the controller configured to detect a circuit fault among a plurality of different types of circuit faults, and to control the operation of one or both of the first neutral-lead switch and the second neutral-lead switch based on the circuit fault,
    wherein the redundant wye-wounded motor includes a stator disposed within a housing, and wherein first ends of the first plurality of neutral leads and the second plurality of neutral leads are selectively connected to the stator and opposing second ends of the of the first plurality of neutral leads and the second plurality of neutral leads are located externally from the housing.

2. The electric motor system of claim 1, wherein the different types of circuit faults include a turn-to-turn fault, a phase-to-phase fault, and a phase-to-ground fault.

3. The electric motor system of claim 2, wherein the controller is configured to determine a level of current flowing through one or both of the first plurality of neutral leads and the second plurality of neutral leads, and detects the circuit fault based on the level of current.

4. The electric motor system of claim 3, wherein the controller detects the turn-to-turn fault based on a comparison between the level of voltage and a first voltage threshold, detects the phase-to-phase fault based on a comparison between the level of voltage and a second voltage threshold, and detects the phase-to-ground fault based on a comparison between the level of voltage and a third voltage threshold.

5. The electric motor system of claim 4, wherein the second voltage threshold is greater than the first voltage threshold, and the third voltage threshold is greater than the first and second voltage thresholds.

6. The electric motor system of claim 5, wherein the controller opens one of the first neutral-lead switch or the second neutral-lead switch in response to detecting the phase-to-phase fault or the phase-to-ground fault.

7. The electric motor system of claim 6, wherein the controller closes the second neutral-lead switch in response to opening the first neutral-lead switch.

8. The electric motor system of claim 6, wherein the controller closes the first neutral-lead switch in response to opening the second neutral-lead switch.

9. The electric motor system of claim 1, wherein the controller is configured to determine that the circuit fault corresponds to a primary wye winding of the redundant wye-wounded motor and in response simultaneously closes the first phase-lead switch and the first neutral-lead switch, and wherein the controller is configured to determine that the circuit fault corresponds to a secondary wye winding of the redundant wye-wounded motor and in response simultaneously closes the second phase-lead switch and the second neutral-lead switch.

10. A method of controlling an electric motor system, the method comprising:
   delivering alternating current (AC) power to a redundant wye-wounded motor that includes a first plurality of phase leads and a second plurality of phase leads and includes a first plurality of neutral leads and a second plurality of neutral leads
   establishing, via a first phase-lead switch, a first selectable signal path that connects the first plurality of phase leads to a power supply;
   establishing, via a second phase-lead switch, a second selectable signal path that connects the second plurality of phase leads to the power supply;
   establishing, via a first neutral-lead switch, a third selectable signal path that connects the first plurality of neutral leads to the redundant wye-wounded motor;
   establishing, via a second neutral-lead switch, a fourth selectable signal path that connects the second plurality of neutral leads to the redundant wye-wounded motor;
   detecting, via a controller in signal communication with the redundant wye-wounded motor, a circuit fault among a plurality of different types of circuit faults; and
   controlling, via the controller, the operation of one or both of the first neutral-lead switch and the second neutral-lead switch based on the circuit fault,
   wherein the redundant wye-wounded motor includes a stator disposed within a housing, and wherein first ends of the first plurality of neutral leads and the second plurality of neutral leads are selectively connected to the stator and opposing second ends of the of the first plurality of neutral leads and the second plurality of neutral leads are located externally from the housing.

11. The method of claim 10, wherein the different types of circuit faults include a turn-to-turn fault, a phase-to-phase fault, and a phase-to-ground fault.

12. The method of claim 11, further comprising determining, via the controller, a level of current flowing through one or both of the first plurality of neutral leads and the second plurality of neutral leads; and
   detecting, via the controller, the circuit fault based on the level of current.

13. The method of claim 12, further comprising:
   detecting, via the controller, the turn-to-turn fault based on a comparison between the level of voltage and a first voltage threshold;
   detecting, via the controller, the phase-to-phase fault based on a comparison between the level of voltage and a second voltage threshold; and
   detecting, via the controller, the phase-to-ground fault based on a comparison between the level of voltage and a third voltage threshold.

14. The method of claim 13, wherein the second voltage threshold is greater than the first voltage threshold, and the third voltage threshold is greater than the first and second voltage thresholds.

15. The method of claim 14, further comprising opening, via the controller, one of the first neutral-lead switch or the second neutral-lead switch in response to detecting the phase-to-phase fault or the phase-to-ground fault.

16. The method of claim 15, further comprising closing, via the controller, the second neutral-lead switch in response to opening the first neutral-lead switch.

17. The method of claim 15, further comprising closing, via the controller, the first neutral-lead switch in response to opening the second neutral-lead switch.

18. The method of claim 10, further comprising:
   determining, via the controller, that the circuit fault corresponds to a primary wye winding of the redundant wye-wounded motor and in response simultaneously closes the first phase-lead switch and the first neutral-lead switch; and
   determining, via the controller, that the circuit fault corresponds to a secondary wye winding of the redundant wye-wounded motor and in response simultaneously closes the second phase-lead switch and the second neutral-lead switch.

* * * * *